(12) United States Patent
Burrola et al.

(10) Patent No.: US 6,737,766 B1
(45) Date of Patent: May 18, 2004

(54) MAGNETIC ACTUATOR AND METHOD

(75) Inventors: Santos Burrola, Chihuahua (MX); Conrado Carrillo, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/388,776

(22) Filed: Mar. 14, 2003

(51) Int. Cl.[7] ............................................. H02K 33/02
(52) U.S. Cl. ....................... 310/23; 310/30; 251/129.15; 123/516
(58) Field of Search ............................... 310/15, 17, 23, 310/24, 30, 34, 35; 335/274; 251/129.02, 129.15; 123/516; 137/589, 629

(56) References Cited

U.S. PATENT DOCUMENTS 5,548,263 A * 8/1996 Bulgatz et al. ............. 335/274
6,265,957 B1 * 7/2001 Baginski et al. ............ 335/266
6,612,338 B2 * 9/2003 Weldon et al. ......... 137/630.19

* cited by examiner

Primary Examiner—Burton S. Mullins
Assistant Examiner—Judson H. Jones
(74) Attorney, Agent, or Firm—Jimmy L. Funke

(57) ABSTRACT

A method and apparatus for controlling a plunger of a magnetic actuator includes generating a first magnetic flux at the plunger that biases the plunger opposing a first bias from a first spring having a first spring rate. A second spring is disposed in series communication with the first spring. The second spring has a second spring rate, such that a combined spring rate of the first and second springs in series is less than either of the first and second spring rates. A second magnetic flux higher than the first magnetic flux is generated biasing the plunger opposing a second bias from the first spring and the second spring in series communication.

22 Claims, 5 Drawing Sheets

MAGNETIC ACTUATOR AND METHOD

TECHNICAL FIELD

The present invention relates generally to improvements to an actuator design and more particularly to improvements in an actuator design for use in automotive applications.

BACKGROUND

It will be recognized that a solenoid assembly can be used in various actuator assemblies for actuation of a certain component and not limited to motor vehicles or internal combustion engines. One use for an actuator assembly having a linear solenoid involves a vehicle evaporative system.

Most motor vehicles are now equipped with a carbon canister installed to trap and store petroleum fuel vapors from the carburetor bowl and/or the fuel tank. Through the use of the canister, fuel vapors are not vented to the atmosphere, but are instead trapped in the canister and then periodically purged from the canister into the engine where they are burned along with the air-fuel mixture. A solenoid valve assembly is typically used to control purging of the carbon canister as well as diverting the flow of other gases within the system.

The solenoid valve assembly includes a plunger that is movable between an open position, wherein the outlet port is not blocked and purge air communicates with the carbon canister, and a closed position, wherein the outlet port is blocked. When a coil of a solenoid within the valve assembly is energized, the magnetic force of the coil will manipulate the position of the plunger and move it to an open position. The solenoid valve for this type of valve assembly will stay open as long as the coil is energized.

Existing solenoid mechanisms include a spring installed in compression within the plunger to bias the plunger in a closed position. When the coil within the cylindrical solenoid mechanism is de-energized, the spring returns the plunger to the closed position wherein a valve cap is pressed tightly against a valve seat thereby blocking the flow of fluids through the valve assembly. The solenoid valve will remain closed as long as the coil remains de-energized.

Different flow rates or purge strategies may be utilized to achieve the desirable purge performance for an engine or other applications of the valve assembly (e.g. limiting or controlling flow between a supply (reservoir) and destination. Some applications require high flow rates with a fully open valve, while others require low flow rates to maximize the control at a low purge ratio.

Existing solenoid mechanisms are fundamentally of linear proportional behavior which means that the output is controlled by means of controlling the armature's displacement or position with the input signal (percent duty cycle). Thus, the slope of the flow of the fuel vapors versus percent duty cycle function of the solenoid mechanism is constant. Such linear proportional purge has in some cases not provided enough resolution to operate at engine idle conditions. As such, there is a need to have a higher flow resolution at lower duty cycles and also provide high flow rates regardless of the low resolution at larger duty cycle values. Accordingly, it is desired that operation of the solenoid mechanism is fully stable at a wide range of vehicle underhood operating conditions using an electrical input signal driver to control the displacement of the armature.

SUMMARY

In an exemplary embodiment, a method for controlling a plunger of a magnetic actuator assembly is disclosed. The method includes: generating a first magnetic flux at the plunger; biasing the plunger by means of the first magnetic flux opposing a first bias from a first spring having a first spring rate; disposing a second spring in series communication with the first spring, the second spring having a second spring rate, such that a combined spring rate of the first and second springs in series is less than either of the first and second spring rates; generating a second magnetic flux at the plunger; and biasing the plunger by means of the second magnetic flux higher than the first magnetic flux opposing a second bias from the first and second springs in series communication.

In another embodiment, a magnetic actuator assembly is disclosed. The magnetic actuator assembly includes: an armature plunger in operable communication with an actuator of the magnetic actuator; a coil configured to generate a first magnetic flux at the plunger; a first spring having a first spring rate in operable communication with the plunger biased by means of the first magnetic flux opposing a first bias from the first spring; and a second spring in series communication with the first spring, the second spring having a second spring rate, such that a combined spring rate of the first and second springs in series is less than either of the first and second spring rates, wherein when the coil is further energized to generate a second magnetic flux higher than the first magnetic flux, the plunger is biased opposing a second bias from the first spring and the second spring in series communication.

The above-discussed and other features and advantages of the present invention will be appreciated and understood by those skilled in the art from the following brief description of the drawings.

BRIEF DESCRIPTION OF THE DRAWINGS

Referring to the exemplary drawings wherein like elements are numbered alike in the several Figures.

DETAILED DESCRIPTION

Figure 1:
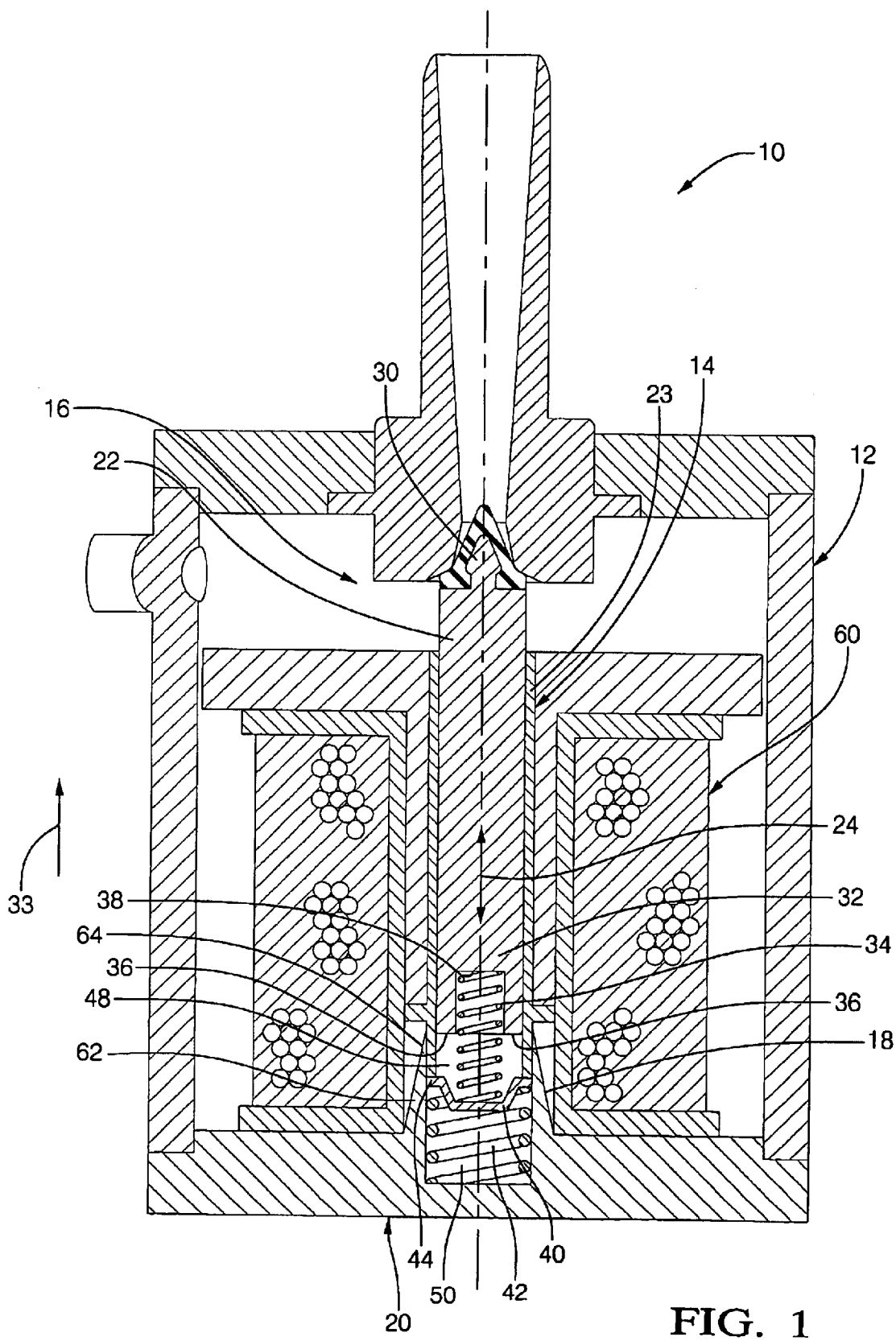
FIG. 1 is a cross-section of a view of a valve assembly in a closed position.

Referring now to FIG. 1, a valve assembly 10 is illustrated. Valve assembly 10 includes a housing 12 and plunger assembly 14. Housing 12 is configured to receive plunger assembly 14 therein. Plunger assembly 14 is configured to have a valve end 16 and a stop end 18. Valve end 16 is configured to provide a means for sealing a valve opening of valve assembly 10. Stop end 18 is configured to make contact with a stop assembly 20. As will be discussed in detail below stop assembly 20 provides a biasing force for maintaining the plunger of valve assembly 10 in a first position.

In an exemplary embodiment, valve assembly 10 is secured to a conduit supplying a hydraulic fluid for use in automotive applications such as a brake line. Of course, and as contemplated in accordance with the instant application, valve assembly 10 may be secured to any type of conduit or tube supplying a liquid, gas or pressurized gas from a supply to desire location.

Figure 3:
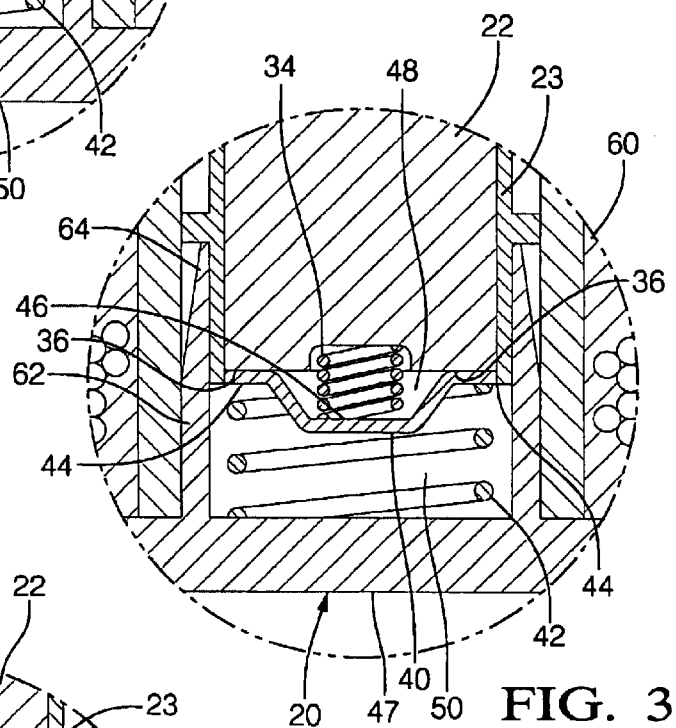
FIG. 3 is a cross-section of the magnetic actuator of FIG. 2 in a partial open position.
Figure 4:
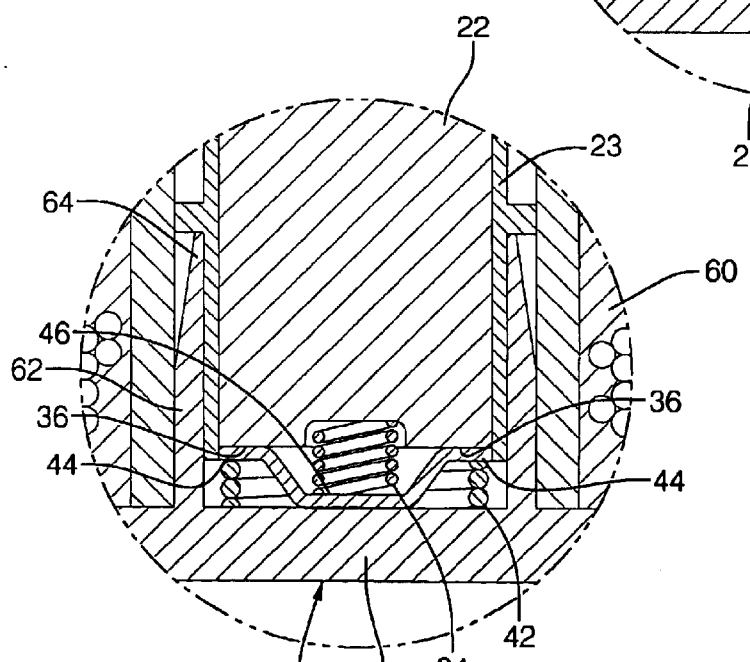
FIG. 4 is a cross-section of the magnetic actuator of FIG. 2 in a full open position.

Valve assembly 10 is constructed so that a plunger 22 is manipulated between a closed position (see FIG. 1), a partial open position (see FIG. 3) and a full open position (see FIG. 4). Plunger 22 is slidably received within an elongated tube 23 of plunger assembly 14. Plunger 22 is constructed out of material that will be moved by a magnetic flux generated by a coil assembly of the valve assembly. Accordingly, and in accordance with the present disclosure plunger 22 is actuatable in the directions defined by arrow 24. Plunger 22 is cylindrical in shape having a valve end portion 30 and an end portion 32. Of course, plunger 22 may have any configuration suitable for movement within tube 23.

End portion 32 is positioned to engage stop assembly 20. As will be discussed in more detail below, stop assembly 20 provides a biasing force against end portion 32 in a direction of arrow 33 that is opposite a direction plunger 22 is actuated by an applied magnetic force.

End portion 32 is configured to receive and engage a portion of a first spring 34 of stop assembly 20. End portion 32 has two flat ends 36 and a recess 38. Recess 38 is positioned on spring end portion 32 to engage first spring 34. Alternatively, first spring 34 is positioned to engage a surface portion of end portion 32 having a protrusion extending therefrom, for example, configured to be received in a bore defined by first spring 34.

First spring 34 also engages a retainer element 40 disposed between first spring 34 and a second spring 42. Retainer element 40 has a stop portion 44 and a receiving area 46. Second spring 42 is disposed between stop portion 44 of retainer element 40 and a bottom 47 defining a bottom portion of housing 12 as shown in FIG. 1. Receiving area 46 engages a portion of first spring 34.

In accordance with an exemplary embodiment of the present disclosure, first spring 34 has a first spring preload that is preferably greater than a second spring preload of second spring 42. The higher spring preload of first spring 34 provides a larger biasing force against plunger 22, which allows plunger 22 to move less distance with respect to the low input control signal increments. Because plunger 22 moves less distance per unit force applied, there is less flow increment from valve assembly 10, providing better resolution of plunger travel with low input control signals. Second spring 42 is preloaded with a selected preload so that it will not compress further after preloading until the force from plunger 22 reaches the same level of force or selected preload; however, once second spring 42 begins to compress, both springs combined have a lower spring rate value ($K_T$), which provides less biasing force against plunger 22 than with a first spring rate ($K_1$) and allows plunger 22 to move a greater distance with same input force increments. Because plunger 22 moves a greater distance with same force increments, there is more flow from valve assembly 10, as plunger 22 is able to translate more quickly to a fully open position. Accordingly, the higher spring rate ($K_1$) of first spring 34 relative to the spring rate ($K_2$) of preloaded second spring 42 combined with the spring rate ($K_1$) of first spring 34 in series, allows valve assembly 10 to provide less flow at the lower percent duty cycles of valve assembly 10 with high resolution control and higher flow at the higher percent duty cycles with low resolution control.

The lower combined spring rate ($K_T$) is less than either $K_1$ of first spring 34 or $K_2$ of second spring 42. In fact the combined spring rate of first spring 34 and second spring 42 is determined by the following equation(s):

$$K_T=(K_1 \times K_2)/(K_1+K_2) \text{ or } 1/K_T=1/K_1+1/K_2$$

It will be recognized by one skilled in the pertinent art that although the first spring preload ($P_1$) for first spring 34 has been discussed as being lower than the second spring preload ($P_2$) for second spring 42, that it is also contemplated that $P_1 \leq P_2$, depending on the output desired and resolution of control at low and high input control signals. In either case, the combined spring rate ($K_T$) is less than either one of the individual spring rates of first and second springs 34 and 42 once plunger 22 exceeds any preload force selected for first spring 34. The effective spring rate opposing plunger 22 motion is first spring rate $K_1$ by first spring 34 once plunger 22 exceeds any preload set on first spring 34 until the plunger matches the selected preload set on second spring 42. When plunger 22 matches the selected preload or calibrated compression force set on second spring 42, the effective spring rate opposing further translation of plunger 22 is a combined spring rate of first spring 34 in series with second spring 42. As discussed above, the combined spring rate is $K_T$ and is effective when second spring 42 begins to work once the preload on second spring 42 is matched. This new effective spring rate $K_T$ is less than either $K_1$ or $K_2$ regardless of whether $K_1$ is less than, greater than or equal to $K_2$.

Retainer element 40 is made from a non-magnetic material, such as stainless steel, or equivalents thereof. Thus, retainer element 40 is not affected by the magnetic flux generated by the coil of the valve assembly. The configuration of stop assembly 20 provides a first area 48 and a second area 50. First area 48 is disposed between end portion 32 and retainer element 40. Second area 50 is disposed between retainer element 40 and bottom 47.

In order to provide actuation of valve assembly 10 and accordingly move plunger 22 in the direction of arrows of 24 a coil assembly 60 is positioned about plunger assembly 14. Coil assembly 60 is disposed about plunger 22 accordingly, and as coil assembly 60 is energized a magnetic field is created wherein plunger 22 is moved against the biasing forces of first and second springs 34, 42 of stop assembly 20.

Figure 2:
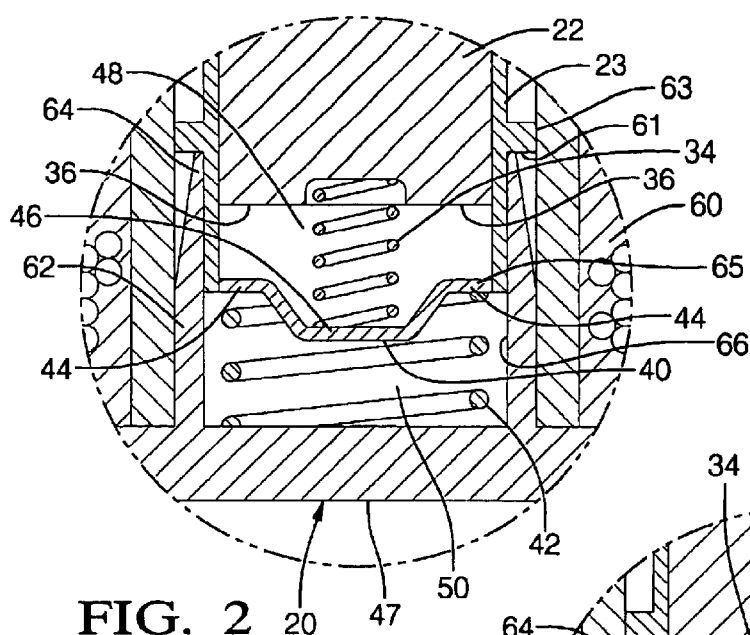
FIG. 2 is a cross-section of a magnetic actuator for the valve assembly of FIG. 1.

Referring now to FIG. 2, an enlarged view of end portion 32 is illustrated. Stop assembly 20 also includes a main body 62 extending from bottom 47 and surrounding second spring 42. At approximately the location of retainer element 40, main body 62 begins to taper and continues to taper to an end 64. End 64 is located at approximately half way along first spring 34 and abuts a shoulder 61 of a flange 63 extending from tube 23. The tapered section of main body 62 of stop assembly 20 provides control of the magnetic flux that is generated at coil assembly 60, so that the movement of plunger 22 can be better controlled.

Still referring to FIG. 2, stop portion 44 of retainer element 40 abuts and end 65 of tube 23 when second spring 34 is preloaded to a selected preload or calibrated force. An edge defining a periphery of retainer element 40 is configured to allow retainer element 40 to translate toward bottom 47 as main body 62 defines a bore 66 configured to allow translation of retainer element 40 against the bias of second spring 42.

A selected preload is set on second spring 42 by various means. In one embodiment, for example, flange 63 is optionally adjustable to translate relative to end 65 of tube 23 allowing tube 23 to translate toward bottom 47 to increase the preload on second spring 42. In this manner, shoulder 61 formed by flange 63 and tube 23, prevents further preload compression on second spring 42 as a result of end 65 biasing stop portion 44 of retainer element 40 toward bottom 47.

Figure 5:
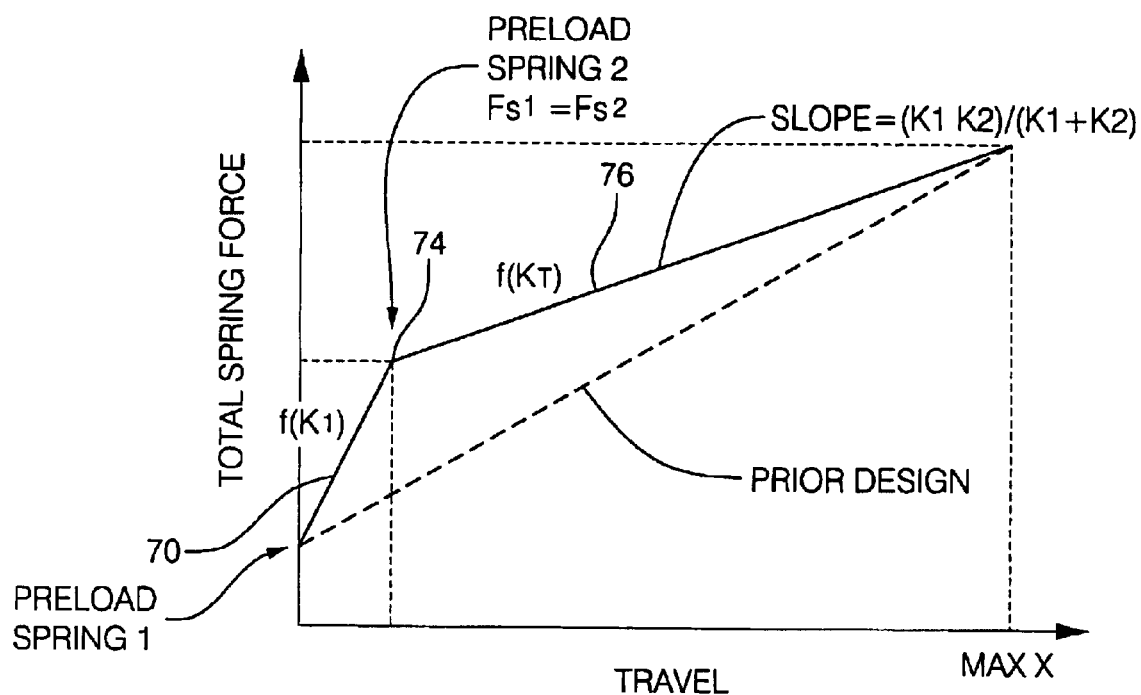
FIG. 5 is a graph of spring force versus spring travel illustrating the relationship of the various slopes to corresponding spring rates of the valve assembly of FIG. 1.

Referring to FIGS. 1–5, valve assembly 10 operates as follows. A first electrical current flows through coil assembly 60, which creates a magnetic flux at tube 23. The magnetic flux causes plunger 22 to move towards retainer element 40 and compress first spring 34 after any preload selected for first spring 34 is met. First spring 34 biases plunger 22 so that first spring 34 initially controls the movement of plunger 22 since first spring 34 opposes plunger 22 translation with a force less than the preload set on second spring 42. In an exemplary embodiment, first spring 34 is preferably a spring having a larger spring rate or spring constant than second spring 42. In addition, regardless of first spring 34 having a larger spring rate than second spring 42, the effective combined spring rate of first spring in series with second spring 42 once the preload on second spring is met, is less than that of the spring rate of first spring 34 alone, accordingly, and in accordance with Hooke's law a greater amount of force is required to compress first spring 34 and accordingly move plunger 22 compared with the series combined springs 34, 42. This is exemplified by a first slope 70 in FIG. 5 comparing the total force to the amount of travel of plunger 22. It will be recognized, that the amount of travel of plunger 22 corresponds to a travel distance of first spring where first slope 70 represents spring rate ($K_1$) of first spring 34. Thus, more force from plunger 22 is required to move plunger 22 against first spring 34 than against the series combined springs 34, 42 once the selected preload on second spring 42 is reached.

Because there is less movement of plunger 22, there is higher flow resolution with lower input control signals or lower input duty cycles. This occurs because when plunger 22 moves a smaller distance with the initial force from the magnetic flux, there is more control over the movement of plunger 22. In addition, lower input control signals corresponding to, for example, lower input duty cycles occur when the engine may be idling and not much flow is required. Thus, by having less relative movement of plunger 22 at the lower duty cycles, there is better flow control resolution while the engine is idling.

As the electrical current is increased, plunger 22 continues to compress first spring 34 as plunger 22 moves toward retainer element 40. When the electrical current reaches a second electrical current, a second magnetic flux is generated to bias plunger 22 to compress first spring 34 and reach the selected preload set on second spring 42. Moreover, when first spring force 34 is equal to the preload force set on second spring 42 and valve assembly 10 is in a partial open position, the total combined spring force versus travel of plunger 22 is indicated as a break point 74 at FIG. 5.

Second spring 42 is preloaded so that at the first electrical current and up to the second electrical current, second spring 42 does not compress. Second spring 42 is preloaded so that second spring 42 does not compress until a predetermined amount of force from plunger 22 is attained (i.e., the preload of spring 42).

When the electrical current is increased to an amount greater than the second electrical current, second spring 42 begins to compress. Second spring 42 has a rate that is combined with that from the first spring resulting in a new spring rate which is less than first spring rate ($K_1$) of first spring 34 or second spring rate ($K_2$) of second spring 42, which results in more movement per total amount of force when comparing the force to the amount of travel of plunger 22. Thus, second spring 42 travels a greater distance with less force from plunger 22. This creates lower flow resolution at the higher input duty cycles, but allows the plunger to translate to full stroke quickly allowing high flow or full travel of plunger 22.

Thus, when comparing the total force to the amount of travel of plunger 22, a second slope 76 (see FIG. 5) is created as the electrical current is increased beyond the second electrical current. The combined spring force of first spring 34 in series with second spring 42 creates second slope 76, which provides a higher gain of travel per increment of compressive force. It will be recognized, that the amount of travel of plunger 22 corresponds to a combined travel distance of first spring 34 and second spring 42 in series where second slope 76 represents spring rate ($K_T$) of the series combined springs 34, 42. Moreover, as the electrical current is increased, the magnetic flux increases and causes more force at plunger 22. The force of plunger 22 compresses second spring 42 and moves plunger 22 towards bottom 47 of stop assembly 20 more quickly as the combined springs in series offers a reduced spring rate ($K_T$).

Figure 6:
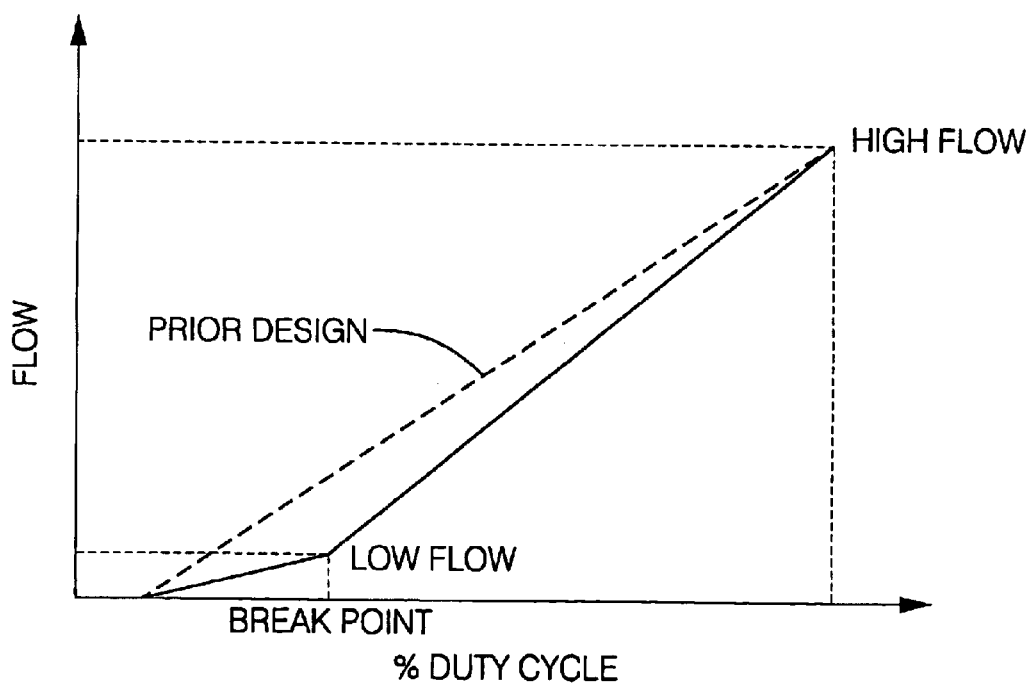
FIG. 6 is a graph illustrating the relationship between flow rate and duty cycle of the valve assembly of FIG. 1.

Referring to FIG. 6, the advantages of having first spring 34 in combination with second spring 42 are illustrated. FIG. 6 is a graph which illustrates the amount of flow of fluid through the an opening of a valve assembly constructed in accordance with the present disclosure versus the percent duty cycle input. In an exemplary embodiment as illustrated in FIG. 6, a preferred input control signal is a pulse width modulated (PWM) signal generated from a current control driver. The dashed line illustrates the prior art flow characteristics in relation to duty cycle that has only a single spring 34 at an end portion of valve assembly 10. In the prior art design, there is a pure linear slope between the relationship of flow and percent duty cycle. The linear slope occurs because the single spring having a single spring rate compresses in a uniform fashion as the amount of electricity flowing through coil 40 increases as a function of the percent duty cycle. As illustrated with the dashed line, the prior art solenoid valves do not provide a high resolution at the low flow values.

While the magnetic actuator disclosed herein has been described for use with evaporator solenoids associated with vehicles, the magnetic actuator device may also be used and incorporated in applications other than evaporator solenoids for a vehicle where enhancement in actuator control at low input control signals is required.

It will be noted that although a current control driver has been described with an exemplary embodiment to provide the input control signals herein, it is contemplated that this invention can be implemented for use with all control actuators using various input control signals. The exemplary embodiment described above is fundamentally of linear proportional behavior which means that the output is controlled by means of controlling the armature's displacement or position with an input control signal. The input control signal is preferably generated from a current control driver, and alternatively from a PWM voltage driver. It will be recognized by one skilled in the pertinent art that when a PWM voltage driver is employed, the break point between low flow and high flow with reference to FIG. 6 will vary as a function of temperature and voltage variation effect.

Other types of actuators designed to generate a proportional output work directly with the frequency of a PWM voltage signal. At every cycle, the armature will move from the totally open/closed position to a totally closed/open position, making possible the control of the output by controlling the frequency of duty cycle of the input signal.

Electromechanical solenoid operated control valves are widely used in the area of electronically controlled automatic transmissions. Two general types of such control valves include pulse width modulated (PWM) control valves and linear control valves. Both types are responsive to a control quantity, typically time varying voltage, to control line pressure, clutch chamber pressure or pilot pressure in a spool valve. It is generally understood that PWM valves have an armature which strokes between first and second positions substantially in frequency correspondence with a time varying voltage signal while a linear control valve has an armature which assumes an equilibrium position in accordance with the electromagnetic force generated by the average current through the solenoid coil and internal bias spring and any hydraulic forces.

Figure 7:
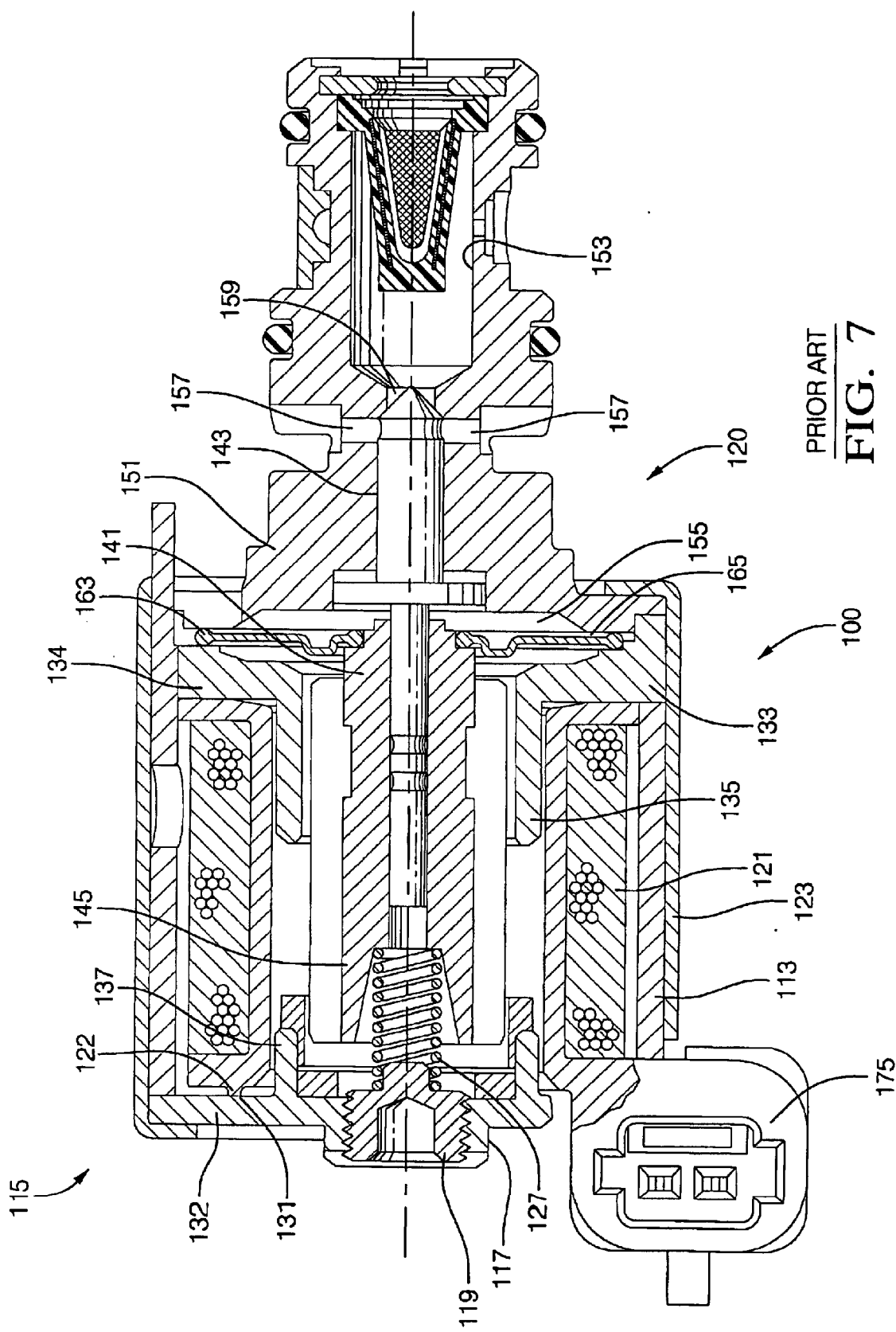
FIG. 7 is a cross-sectional view of a prior art hydraulic solenoid control valve having a single spring.

Referring to FIG. 7, a prior art hydraulic solenoid control valve 100 is illustrated having an electromechanical portion generally designated by the numeral 115 and a hydraulic portion generally designated by the numeral 120. The hydraulic portion 120 comprises fluid passage housing 151 including fluid inlet 153, chamber 155, poppet seat 159 and fluid exhaust passages 157. Poppet 143, which is displaceable between a seated position against poppet seat 159 as illustrated and a fully unseated position, provides for variable fluid bleed-off from fluid inlet 153 to exhaust passages 157. Aspects of fluidic operation are generally well known to those skilled in the art and further discussion thereof is not necessary for a complete understanding of the present disclosure.

The electromechanical portion 115 of solenoid valve 100 is generally constructed with a multiple winding electrical coil 121 surrounding an armature 141 fabricated from a ferromagnetic material. Coil 121 is conventionally wrapped around a non-magnetic spool 122 as illustrated. Spool 122 is preferably molded with integral connector body 175. Ferromagnetic pole pieces, generally designated, 131 and 134 are located adjacent the coil 121 at opposite axial ends thereof. Each pole piece 131 and 134 has a respective substantially annular portion, 132 and 133, extending radially beyond the outer circumference of coil 121. Pole piece 134 has a central aperture defined by the annular portion 133 and preferably continues generally within the inner sidewall of the spool to define an axially extending cylindrical portion 135 with similarly sized aperture. Pole piece 131 also has a central aperture defined by annular portion 132 and an axially extending cylindrical portion 137. As illustrated in FIG. 7, the annular portion 132 of pole piece 131 is peripherally abbreviated in the area of connector body 175 in order to accommodate the externalization of the electrical interface. Ferromagnetic sleeve 113 substantially surrounds coil 121 and spool 122 and extends axially between pole pieces 131 and 134 at the outer peripheries of respective annular portions 132 and 133. Of course, accommodation of the connector body precludes complete enclosure of the coil and spool at least in the limited general area thereof.

Armature 141 is located substantially coaxially with the aperture through annular portion 133 of pole piece 134 such that it is in spaced adjacency with the cylindrical portion 135 of pole piece 134. This non-bearing positional relationship is provided for by a radially non-compliant member 165 which extends radially from the armature to a portion of the pole piece 134. Preferably, member 165 takes the form of a diaphragm spring formed from long-life stainless steel, one such exemplary material being 7C27MO2 stainless steel available from Sandvik, Inc., Fair Lawn, N.J. In the embodiment of FIG. 7, the armature 141 is characterized by several progressively smaller diameter sections or steps which provide convenient mounting provisions for staking member 165 thereto. Similar steps are provided in analogous fashion toward the outer periphery of the annular portion 133 of pole piece 134 which likewise provide convenient mounting provisions for the outer periphery of member 165. A flexible seal 163 is similarly located between the armature 141 and pole piece 134. Seal 163 seats similarly upon respective stepped portions of the armature 141 and annular portion 133 of pole piece 134. Hydraulic portion 120 of the solenoid valve 100 bears against the outer periphery of the member 165 at an outer lip or rim 151. Frame 123 is crimped or rolled over annular portion 132 of pole piece 131 to retain the structures described.

At the axial end of the armature 141 closest to pole piece 134 is poppet 143 which is preferably a part separately fabricated and is press fitted into, or otherwise secured to, armature 141. This assembly is fabricated to stringent dimensional tolerances to be able to set overlap of the armature 141 with respect to pole piece 131 and specifically the cylindrical portion 137. The other axial end of armature 141 has a bore defined by tapered side wall 145. Located within the bore and communicating with the base thereof is bias spring 127. The tapered side wall feature prevents spring 127 from binding within the bore and contributes to the overall desirable magnetic characteristics of such a linear device. The opposite end of spring 127 bears against screw 119 threaded into ferromagnetic collar 117. Collar 117 is formed integral with the pole piece 131, or alternatively is formed of separate pieces. While described separately, collar 117 and screw 119 are considered to be portions of pole piece 131. Screw 119 provides for a range of adjustment to the spring bias force. Collar 117 is substantially aligned with the terminal portion of tapered side wall 145 of armature 141, the flux therebetween generally providing increased axial motive force at higher current levels as the armature is increasingly displaced toward the left in the FIG. 7. When the armature is in the full rightward position as illustrated, however, the majority of axial motive force is impressed vis-a-vis the flux between the tapered side wall and the cylindrical portion of pole piece 131. The gap between collar 117 and armature 141 is set to establish the desired force versus displacement characteristics of the solenoid valve in a fashion familiar to those skilled in the art. Therefore, the depth of insertion of collar 117 into the cylindrical portion is determined by the desired performance characteristics of the particular application. Pole piece 131 generally closes the respective end of the solenoid as embodied in the plugging function of the collar 117 and screw 119. Where the additional feature of spring bias force adjustability is not desired, the cylindrical portion may be eliminated and the pole piece 131 formed without the central aperture therethrough.

Figure 8:
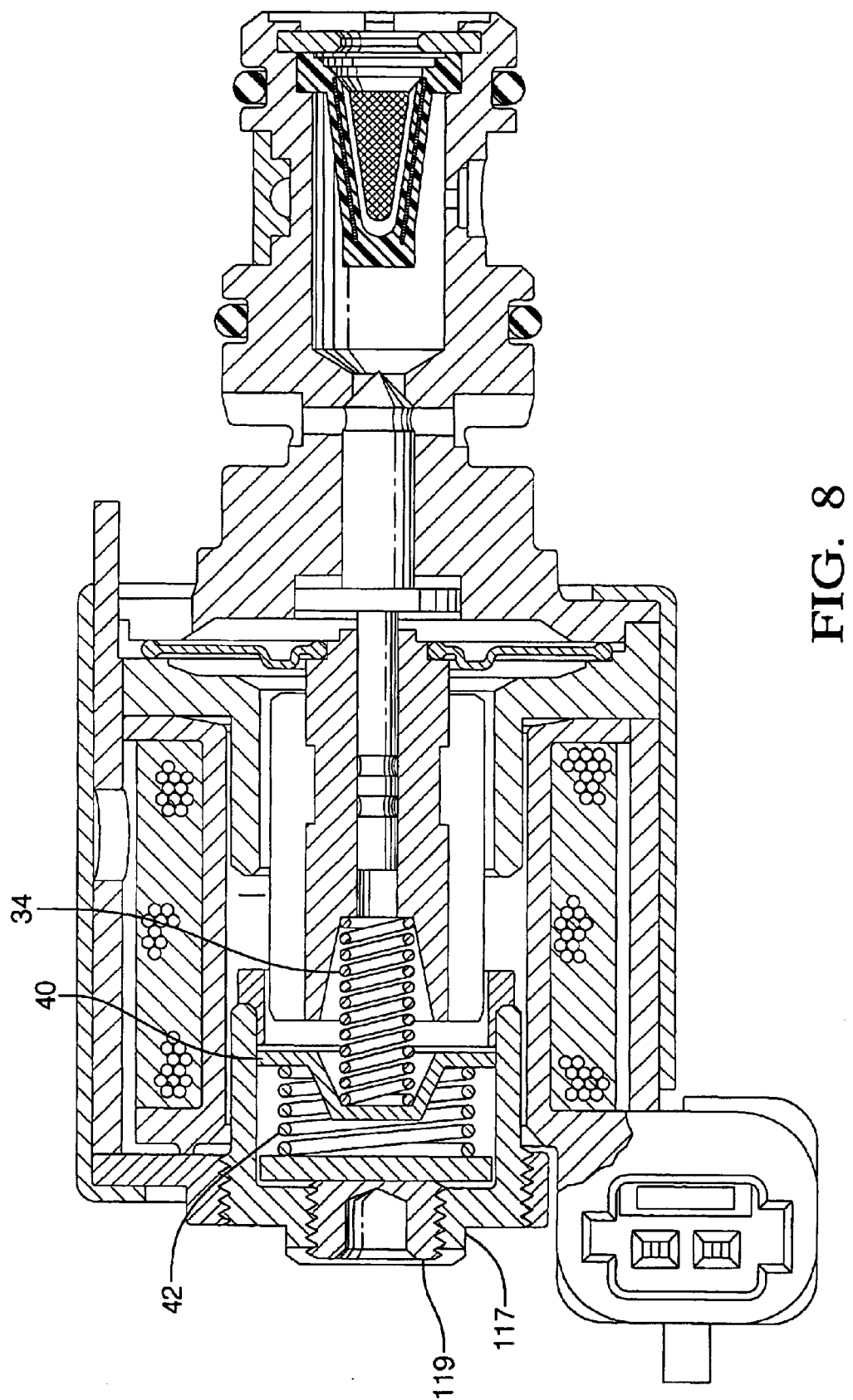
FIG. 8 is a cross-sectional view of the hydraulic solenoid control valve of FIG. 7 replacing the single spring with a first and second spring shown in FIGS. 1–4.

FIG. 8 illustrates the actuator of FIG. 7 incorporating the arrangement of first spring 34, retainer element 40, and second spring 42 in place of spring 127 in valve 100. The advantage of having first spring 34 and second spring 42 is that as plunger 22 moves towards bottom 47, first spring 34 in combination with second spring 42 allow a greater range of control over plunger 22 with the current being supplied to the coil. Moreover, the output signals can be easily adjusted by altering the relative spring rates of first and second springs 34, 42, as well as provide more or less preload on first spring 34 and second spring 42. By having better control of the output, there is improved system performance using the above disclosed biasing scheme.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling a plunger of a magnetic actuator assembly, the method comprising:
    generating a first magnetic flux at said plunger;
    biasing said plunger by means of said first magnetic flux opposing a first bias from a first spring, said first spring having a first spring rate;
    disposing a second spring in series communication with said first spring, said second spring having a second spring rate, such that a combined spring rate of said first and second springs in series is less than either of said first and second spring rates;
    generating a second magnetic flux at said plunger; and
    biasing said plunger by means of said second magnetic flux higher than said first magnetic flux opposing a second bias from said first spring and said second spring in series communication.

2. The method of claim 1 further comprising:
    preloading said second spring with a preload, said plunger effected by said combined spring rate of said first spring and said second spring in series communication when said plunger matches said preload.

3. The method of claim 2, wherein said plunger is effected solely by said first spring rate of said first spring and said second spring in series communication until said plunger matches said preload.

4. The method of claim 2 further comprising:
    preloading said first spring with a first preload, said plunger effected by said first spring rate of said first spring and said second spring in series communication when said plunger matches said first preload.

5. The method of claim 4 further comprising:
    disposing a retainer element between said first and second springs in series communication;
    applying said preload via said retainer element such that said second spring is preloaded.

6. The method of claim 5, wherein said retainer element is configured to receive said first spring in a cavity formed on one side of said retainer element and receive said second spring within a peripheral portion defining an opening to said cavity on an opposite side of said retainer element.

7. The method of claim 5, wherein said first spring rate is greater than said second spring rate.

8. The method of claim 1, wherein said first magnetic flux is generated by a first input duty cycle and said second magnetic flux is generated by a second input duty cycle larger than said first input duty cycle.

9. The method of claim 8, wherein an input duty cycle in a first range proximate said first input duty cycle provides higher resolution of output control of said plunger than in a second range proximate said second input duty cycle.

10. The method of claim 1, wherein said first and second magnetic flux is generated by at least one of a pulse width modulated (PWM) current control driver, PWM voltage driver, and PWM frequency.

11. A method for controlling a plunger of a magnetic actuator assembly in a purge control valve assembly in a vehicle, the method comprising:
    arranging a first spring having a first spring rate and preloaded with a first preload between a first end of said plunger and a retainer element;
    arranging a second spring having a second spring rate and preloaded with a second preload larger than said first preload between said retainer element and a stop assembly, and a second end of said plunger in operable communication with a purge control valve assembly, wherein said first spring rate is greater than an effective spring rate of said first and second springs serially combined when said plunger is biased at an opposing bias of said second preload, said first spring rate effective when said plunger is biased at an opposing bias of said first preload and less than an opposing bias of said second preload.

12. A magnetic actuator assembly comprising:
    an armature plunger in operable communication with an actuator of the magnetic actuator;
    a coil configured to generate a first magnetic flux at said plunger;
    a first spring having a first spring rate in operable communication with said plunger, said plunger is biased by means of said first magnetic flux opposing a first bias from said first spring; and
    a second spring in series communication with said first spring, said second spring having a second spring rate, such that a combined spring rate of said first and second springs in series is less than either of said first and second spring rates,
    wherein when said coil is further energized to generate a second magnetic flux, said plunger is biased by means of said second magnetic flux higher than said first magnetic flux opposing a second bias from said first spring and said second spring in series communication.

13. The assembly of claim 12, wherein said second spring is preloaded with a preload, said plunger effected by said combined spring rate of said first spring and said second spring in series communication when said plunger matches said preload.

14. The assembly of claim 13, wherein said plunger is effected solely by said first spring rate of said first spring and said second spring in series communication until said plunger matches said preload.

15. The assembly of claim 13, wherein said first spring is preloaded with a first preload, said plunger effected by said first spring rate of said first spring and said second spring in series communication when said plunger matches said first preload.

16. The assembly of claim 15 further comprising:
    a retainer element disposed between said first and second springs in series communication.

17. The assembly of claim 16, wherein said preload is applied via said retainer element such that said second spring is preloaded.

18. The assembly of claim 16, wherein said retainer element is configured to receive said first spring in a cavity formed on one side of said retainer element and receive said second spring within a peripheral portion defining an opening to said cavity on an opposite side of said retainer element.

19. The assembly of claim 16, wherein said first spring rate is greater than said second spring rate.

20. The assembly of claim 12, wherein said first magnetic flux is generated by a first input duty cycle and said second magnetic flux is generated by a second input duty cycle larger than said first input duty cycle.

21. The assembly of claim 20, wherein an input duty cycle in a first range proximate said first input duty cycle provides higher resolution of output control of said plunger than in a second range proximate said second input duty cycle.

22. A magnetic actuator assembly for controlling a plunger in a purge control valve assembly in a vehicle, the method comprising:

a first spring having a first spring rate and preloaded with a first preload disposed between a first end of said plunger and a retainer element;

a second spring having a second spring rate and preloaded with a second preload larger than said first preload disposed between said retainer member and a stop assembly, and a second end of said plunger in operable communication with a purge control valve assembly, wherein said first spring rate is greater than an effective spring rate of said first and second springs serially combined when said plunger is biased at an opposing bias of said second preload, said first spring rate effective when said plunger is biased at an opposing bias of said first preload and less than an opposing bias of said second preload.

* * * * *